INVENTORS:
GEORGE S. MACOR
WALTER J. KRUPICK
RICHARD F. CIMERA

ATTORNEY

United States Patent Office 3,538,776
Patented Nov. 10, 1970

3,538,776
METHOD AND MEANS FOR CALIBRATING SPRING RATE AND GIMBAL UNBALANCE IN FREE-ROTOR FLEXURE-SUSPENDED GYROSCOPES
George S. Macor, Bloomfield, Walter J. Krupick, Succasana, and Richard F. Cimera, Fairfield, N.J., assignors to Singer-General Precision, Inc., Little Falls, N.J., a corporation of Delaware
Filed Sept. 20, 1968, Ser. No. 761,148
Int. Cl. G01c 19/04
U.S. Cl. 74—5                                4 Claims

ABSTRACT OF THE DISCLOSURE

A slim, elongated rod is adjustably and axially supported within the middle gimbal of the gyroscope's flexure hinge assembly. The length of the rod is calculated so that its moment of inertia is sufficient to cancel the hinge assembly's positive spring rate. The axial position of the rod is then adjusted to cancel gimbal unbalances produced by misalignments between the flexure hinge axes and mass unbalances in the inertial flywheel and gimbal structure. Spring rate vernier adjustment is provided by removing the rod and machining-off a portion thereof.

BRIEF SUMMARY OF THE INVENTION

The present invention relates generally to the art of gyroscopes, and more particularly, to an improved version of the "Two-Axis Gyro" fully disclosed in U.S. Pat. No. 3,354,726 issued to W. J. Krupick and R. F. Cimera, and assigned to the same assignee as the present invention.

The prior art gyroscope is of the free-rotor flexure-suspended type featuring a universal joint flexure hinge assembly for interconnecting the inertial flywheel or rotor to one end of a drive shaft and for permitting tilting of the rotor about a pair of quadrature axes perpendicular to the spin axis of the shaft. The flexure hinge assembly, itself, comprises an inner, one-piece, four-flexure-bar, three-gimbal, universal joint having high axial strength along the spin axis, and a coaxial outer, one-piece, three-gimbal, four-flexure-bar, universal joint having high radial and torsional strength relative to the shaft's spin axis. In addition, the middle gimbal portion of the inner hinge unt has concentrically positioned therein a two-element dynamic balance compensator for cancelling the positive spring rate restaints produced when the gimbals in each respective hinge unit pivot relative to one another through their respective interconnecting flexure bars. This prior art spring rate compensator includes a first dynamic balance weight which is adjustably displaceable in the axial direction with regard to the spin axis, and a second dynamic balance weight of much smaller size which is concentrically and axially displaceable relative to the first weight and which is used to "trim" the spring rate compensator or provide a delicate vernier-like adjustment thereto.

In practice, it was found that the above-described two-piece prior art spring rate compensator suffered from a variety of drawbacks which reduced the overall cost-effectiveness and operational accuracy of the gyroscope. In the first instance, the axial position of each element had to be separately calibrated before each piece could be permanently and respectively cemented in place. This consumed much time and was therefore very expensive. Furthermore, because of the extremely small size of the vernier element, it was very difficult to maintain an accurate alignment between the latter and the main element during the final stages of calibration. Consequently, the vernier calibration was found to be imprecise and errors in spring rate calibration were observed resulting in a net spring rate restraining torque which, of course, caused the gyro to drift. Moreover, the prior art spring rate compensator failed to provide compensation for static gimbal unbalances produced by misalignments between the flexure hinge quadrature axes on the one hand and mass unbalances in the hinge gimbals on the other hand. The effect of such gimbal unbalance was manifested in the generation of an additional rectified restraining torque and therefore an additional drift component on the inertial flywheel particularly when the gyro was subjected to virbrations perpendicular to its spin axis at frequencies equal to twice the annular velocity of the flywheel.

Against this background, it became increasingly apparent that a need existed for a more efficient, less expensive, and more versatile spring rate compensation means. Accordingly, it is the primary purpose of the present invention to provide an improved flexure hinge spring rate compensator for use in free-rotor flexure-suspended gyroscopes.

It is a further object of the present invention to provide a flexure hinge spring rate compensator that is extremely simple in construction and which may accurately be calibrated in a relatively short time.

It is yet a further object of the present invention to provide a flexure hinge spring rate compensator that may effectively and simultaneously be used to cancel static gimbal unbalances in free-rotor flexure-suspended gyroscopes.

To the accomplishment of these and other objectives, the improved spring rate compensator according to the present invention comprises a single, one-piece, elongated, slim balance rod axially positioned within a bore in the middle gimbal of the gyro's inner flexure hinge unit. The balance rod is adjustably supported in a sleeve which is designed to frictionally engage the rod and maintain the latter's position, yet permit easy axial adjustment thereof during spring rate and gimbal unbalance calibration.

Additional objects and advantages as well as a complete understanding of the invention will be made more apparent from a study of the following detailed description thereof in connection with the accompanying drawings.

DETAILED DESCRIPTION OF THE INVENTION

Figure 1:
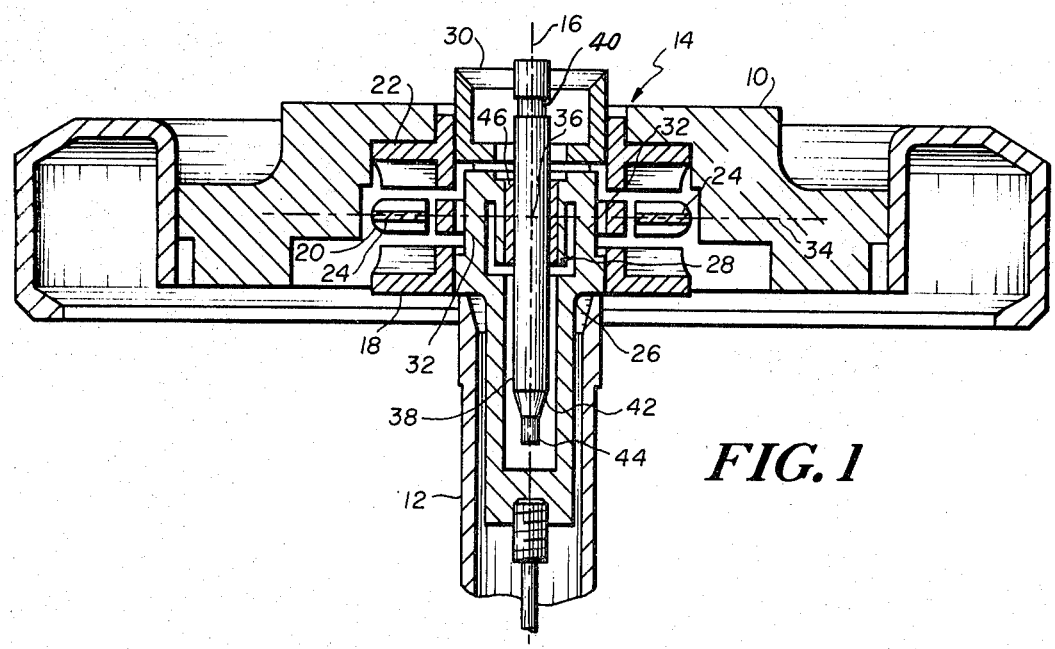
FIG. 1 is a schematic cross-section showing the spring rate compensator in accordance with the present invention.

Referring now to FIG. 1, there is schematically shown in cross-section a portion of a free-rotor flexure-suspended gyroscope including a rotor or inertial flywheel 10, a drive shaft 12, and a frictionless flexure hinge assembly, generally indicated by reference character 14, for interconnecting the flywheel to the shaft and for forming a universal joint therebetween. The other parts of the gyroscope, including, for example, the outer casing, the journal bearings for the drive shaft, the drive motor, etc. have all been omitted for the sake of clarity inasmuch as these elements may be of conventional well-known design, the details of which are not deemed requisite for a complete and thorough understanding of the present invention. Suffice it to say that in the operation of the gyroscope rotation is imparted from shaft 12 through hingle assembly 14 to the inertial flywheel 10 causing the latter to spin about the shaft's axis 16.

Flexure hinge assembly 14, which may be the same hinge assembly fully disclosed in the above-mentioned patent to Krupick et al., comprises an outer hinge unit including a lower gimbal 18, a middle gimbal 20, and an upper gimbal 22. Middle gimbal 20 includes a first pair of diametrically opposed flexure elements or bars 24 for interconnection with lower gimbal 18 and a second pair of diametrically opposed flexure bars (not shown) in quadrature with the first pair for interconnection with upper gimbal 22.

The flexure hinge assembly also includes an inner hinge unit comprising a lower gimbal 26, a middle gimbal 28 and an upper gimbal 30. The lower gimbal 26 is connected to the middle gimbal 28 through a first pair of diametrically opposed flexure bars 32 and the upper gimbal 30 is connected to the middle gimbal 28 through a second pair of diametrically opposed flexure bars (not shown) in quadrature with the first pair.

The lower gimbal 18 of the outer hinge unit is fixedly connected to the lower gimbal 26 of the inner hinge unit and the upper gimbal 22 of the outer hinge is fixedly connected to the upper gimbal 30 of the inner hinge unit so that the upper and lower gimbals in each unit may pivot relative to each other, respectively, about a first common flexure axis 34 normal to spin axis 16 and about a second common flexure axis 36 commonly intersecting the spin axis 16 and the first flexure axis 34 and normal thereto as viewed in FIG. 1. In addition, the upper gimbal 22 of the outer hinge unit is fixedly fastened to the inertial flywheel 10 while the lower gimbal 26 of the inner hinge unit is fixedly fastened to the drive shaft 12. With this arrangement, it will thus be appreciated that the inner and outer hinge units complement one another and permit the flywheel 10 to pivot relative to shaft 12 during rotation thereof about any transverse axis perpendicular to spin axis 16. For a more detailed description of the construction and/or operation of flexure hinge assembly 14, the reader's attention is directed to FIGS. 5 through 14 and the accompanying text contained in the previously mention Krupick et al. Pat. 3,354,726.

One factor affecting the accuracy of free-rotor gyroscopes utilizing the flexure hinge suspension outlined above are the positive spring rate restoring forces produced within the flexure elements themselves when the rotor pivots relative to the spin shaft. These forces tend to oppose the rotor's displacement and thereby act as restraining torques on the rotor causing the latter to drift at right angles to the original displacement. In order to cancel out such undesirable torque restraints, so-called spring rate compensation means are usually provided.

Figure 2:
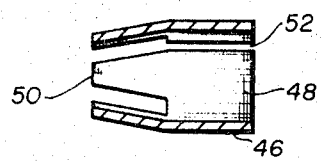
FIGS. 2 and 3 are detailed views of the sleeve member support shown in FIG. 1.
Figure 3:
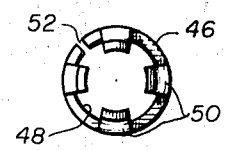

In accordance with the present invention, an improved form of spring rate compensation means is contemplated comprising in its preferred embodiment a generally cylindrical, elongated rod 38 disposed coaxially within a bore in the middle of gimbal 28 of the inner hinge unit substantially as shown. The spring rate compensation rod includes a machined-down neck portion 40 near its upper extremity for permitting easy insertion and removal into and from middle gimbal 28 by way of a suitable gripping tool (not shown). In addition, the extreme lower portion of the rod includes a tapered section 42 and an adjacent machined-down terminal section of constant diameter to form a locating pin 44 to further simplify insertion of the rod into the central recess of the middle gimbal 28. For supporting the rod and permitting axial adjustment thereof, there is provided a relatively thin-walled, metallic cylindrical sleeve member 46 indicated in cross-section in FIG. 1 and shown in more detail in FIGS. 2 and 3.

The sleeve member includes a main body portion 48 and a plurality of equidistantly annular spaced fingers or tongs 50 each one of which is normally axially tapered and bent so as to have its free end extend radially inward as illustrated. Sleeve member 46 also incorporates a slot 52 parallel to its axis for permitting the sleeve to contract circumferentially when it is inserted within the middle gimbal 28. The main body portion 48 will thus tend to be urged radially outward against the interior surface of the middle gimbal's bore in an effort to return to its noncontracted condition, and the resulting positive spring force will help maintain the sleeve's position within the middle gimbal until a coat of cement previously applied therein may be cured by the application of heat.

When the spring rate compensation rod 38 is axially positioned within sleeve member 46 as substantially shown in FIG. 1, the tongs 50 will be urged radially outward to conform to the outside diameter of the central portion of the rod. Since this will maintain the tongs in a constantly flexed condition, they will continuously be spring biased radially inward thereby frictionally engaging the rod and holding it in place. It will be understood that although the spring force exerted by the flexed tongs is sufficient to maintain the position of the compensation rod static during normal operation of the gyroscope, it is contemplated that this frictional gripping force will still be small enough to facilitate axial repositioning of adjusting of rod 38 for purposes of calibrating spring rate and/or gimbal unbalance compensation as will be more fully explained hereinbelow.

In principle, the positive spring rate of the flexure hinge assembly may be fully cancelled by the negative spring rate introduced by the compensation rod 38. Since K, the positive spring rate (expressed in terms of deg./hr./arc-sec. or $T/\theta$), may be obtained in a known manner by measuring the natural frequency of a noncompensated flexure hinge-rotor assembly, the positive spring rate of the rod may be given by $$\frac{T}{\theta} = \frac{\omega^2 (\Sigma I)}{2} \qquad (1)$$

where $\omega$ is equal to the inertial flywheel's angular velocity and $\Sigma I$ represents $I_x + I_y - I_z$, the sum of the moments of inertia of rod 38 taken about each hinge flexure axis and the spin axis. It can be shown that for a cylindrical body of mass $m$, radius $R$, and length $h$ $$I_x = I_y = m \left( \frac{3R^2 + h^2}{12} \right) \qquad (2)$$

and $$I_z = \frac{mR^2}{2} \qquad (3)$$

Then, $$(I_x + I_y - I_z) = m \left( \frac{3R^2 + h^2}{12} \right) + m \left( \frac{3R^2 + h^2}{12} \right) - \frac{mR^2}{2}$$

$$= m \left( \frac{3R^2 + h^2 + 3R^2 + h^2 - 6R^2}{12} \right)$$

$$= m \left( \frac{2h^2}{12} \right)$$

$$= m \frac{h^2}{6} \qquad (4)$$

and $$\frac{T}{\theta} = \frac{\omega^2 m h^2}{12} \qquad (5)$$

from which the length of rod 38 for a given mass may easily be calculated. Equation 5 makes it implicit that the rod 38 should be axially positioned within middle gimbal 28 with its mass center coincidental with the intersection of flexure axes 34 and 36. However, since the rod is not truly symmetrical, and furthermore, since the mass center thereof will be axially displaced from the intersection of the flexure axis by a predetermined amount in order to compensate for static gimbal unbalances as will be further described hereinbelow, it is contemplated that the moment of inertia of rod 38 may be "trimmed" or given a vernier-like adjustment by machining off a portion of the locating pin 44 after measuring the net spring rate of the rotor-hinge assembly subsequent to initial positioning of the rod therein.

As mentioned previously, another factor affecting the accuracy of free-rotor flexure suspended gyroscopes is the net static gimbal unbalance produced by (1) misalignments between the quadrature flexure axes and (2) static mass unbalances among the hinge gimbals per se. This phenomenon will now be more fully described by reference to FIG. 4 wherein similar reference numerals represent similar parts.

Figure 4:
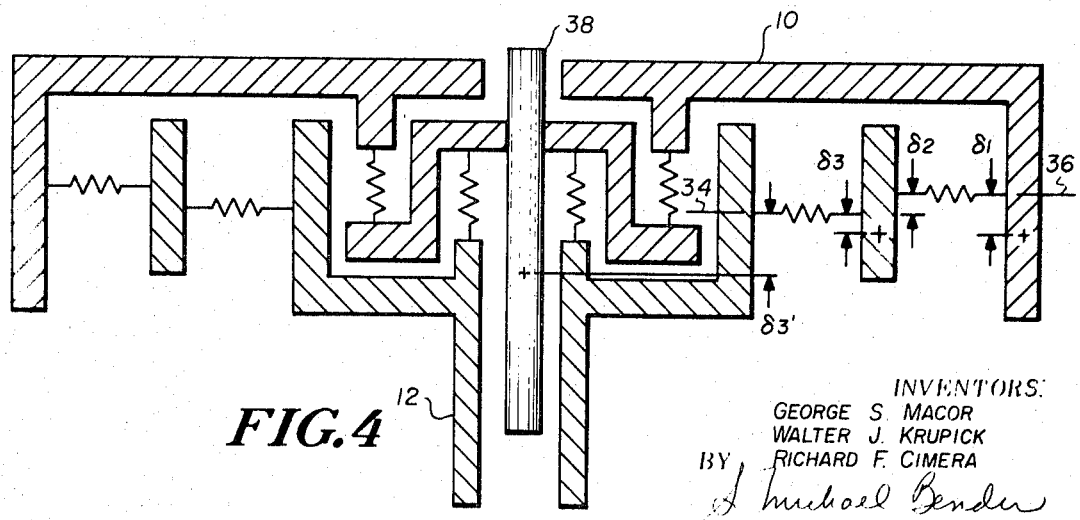
FIG. 4 is a schematic illustrating gimbal unbalance calibration in accordance with the present invention.

FIG. 4 is a somewhat simplified schematic equivalent of FIG. 1 showing essentially the same elements depicted therein. In particular, it will be noted that the two quadrature hinge axes 34 and 36 are shown in the same plane (i.e., the plane of FIG. 4) to simplify the presentation of hinge axis misalignment, and that the eight flexure elements or bars coupling the rotor to the spin shaft are depicted as spring connections. As indicated in FIG. 4, $\delta_1$, represents the distance between the rotor's mass center and hinge axis 36, $\delta_2$ represents the misalignment between axis 34 and axis 36, $\delta_3$ represents the distance between the mass center of the entire hinge-gimbal assembly and hinge axis 34, and $\delta_3'$ represents the distance between the mass center of spring rate compensation rod 38 and hinge axis 34. The static mass unbalance between the rotor and the hinge gimbals with respect to axis 36, hereinafter referred to as $MUB_1$, is given by $$M\delta_1 \quad (6)$$

where M is equal to the mass of the flywheel. Likewise, the static mass unbalance between the rotor and the hinge gimbals with respect to axis 34, hereinafter referred to as $MUB_2$ may be expressed as $$M(\delta_1-\delta_2)+m\delta_3+m'\delta_3' \quad (7)$$

where $m$ represents the mass of the entire hinge gimbal assembly and $m'$ signifies the mass of the compensation rod 38. The difference between the mass unbalances with respect to each axis is equal to the total static gimbal unbalance or as simply referred to hereinafter, GUB; that is, $$GUB=MUB_1-MUB_2 \quad (8)$$

It follows that $$GUB=M\delta_2-m\delta_2-m'\delta_3'$$

For GUB=0, then, $$m'\delta'=M\delta_2-m\delta_3 \quad (9)$$

which is another way of saying that GUB may be entirely cancelled by axially positioning the center of mass of a compensation rod of a given mass a distance $\delta_3'$ from the hinge axis 34.

In accordance with the present invention, the above method is employed to determine the final static axial position of spring rate compensation rod 38 with the exception that instead of calculating the right side of Equation 9, $MUB_1$ and $MUB_2$ are measured directly and the rod is axially adjusted until the difference between $MUB_1$ and $MUB_2$ goes to zero.

The latter may be accomplished in a preferred manner as follows. The gyroscope, with its compensation rod's center of mass nominally centered at the intersection point of the flexure hinge axes, is oriented so that the flexure axis 36 is normal to a local gravity vector. In this posture, the rotor will be displaced off null by a certain amount. Bias current is then fed into the gyro's torquer coils associated with axis 36 until the rotor is restored to null. The gyro is then rotated 180° about its spin axis whereupon flexure axis 36 will again be oriented normal to the local gravity vector and the rotor displaced from null. This new displacement is then nulled as before by feeding bias current into the gyro's torquer. The respective bias currents required to restore the rotor to its null position, in each of the gyro's flip-flopped positions are then subtracted from one another and the difference divided by two. The result is proportional to $MUB_1$. The gyro is then rotated 90° about its spin axis whereupon flexure axis 34 now assumes a position normal to the local gravity vector. Bias currents are again fed into the gyro's torquer coils in each of two inverted positions as above and a quantity proportional to $MUB_2$ is thereby obtained. The compensation rod 38 is then axially adjusted within its sleeve member 46 by an amount equal to $\delta_3'$ until the difference between the $MUB_1$ and $MUB_2$ bias current measurements is brought to zero at which point GUB will also be zero.

Now it will be recalled that the length of the compensation rod 38 was determined from Equation 5 which required that the center of mass of the rod be coincidental with the intersection of the flexure hinge axes for theoretically accurate spring rate compensation. However, when the adjustment for GUB=0 was made as described immediately above, the center of mass of rod 38 was axially displaced by an amount $\delta_3'$ with reference to flexure axis 34 as shown in FIG. 4. Therefore, after the initial GUB adjustment has been completed, the spring rate of the flexure hinge assembly is again measured, the rod 38 removed, and a portion of pin 44 machined-off to provide a final vernier adjustment of the moment of inertia of rod 38 and consequently of the spring rate compensation of the flexure hinge assembly. Since the vernier adjustment will, in turn, change the mass center of the rod, it is then necessary to recalibrate the axial position of the rod to again reduce GUB to zero in the same manner described above. However, this last GUB calibration will ordinarily be so slight as to have no further affect on either the moment of inertia of rod 38 and/or the spring rate compensation of the flexure hinge assembly.

It is thus seen that the present disclosure relates to an improved form of gyroscope spring rate compensation means which latter is simple in construction, relatively easy to calibrate, and additionally, provides accurate compensation for gimbal unbalances.

Obviously, many additional variations and modifications will be apparent to those skilled in the art without departing from the principles of the present invention.

We claim:

1. In a gyroscope including a rotor, a shaft for driving said rotor about a spin axis, and a two-axis universal joint, multi-gimbal, flexure hinge assembly for interconnecting said rotor to said shaft wherein the improvement comprises:

means disposed within said flexure hinge assembly for compensating said flexure hinge assembly's dynamic positive spring rate, said means being effective to compensate for static gimbal unbalances produced in said assembly by misalignments between the latter's axes and mass unbalances in the rotor and/or gimbals of said assembly, said means comprising an elongated, slim rod coaxially positioned relative to said spin axis, said rod having a length calculated to define a moment of inertia about said flexure axes and said spin axis sufficient to cancel the dynamic positive spring rate of said flexure hinge assembly wherein said rod further includes a terminal portion adapted to be partially machined off to thereby provide a vernier adjustment to the moment of inertia of said rod.

2. In a gyroscope including a rotor, a shaft for driving said rotor about a spin axis, and a two-axis universal joint, multi-gimbal, flexure hinge assembly for interconnecting said rotor to said shaft wherein the improvement comprises:

means disposed within said flexure hinge assembly for compensating said flexure hinge assembly's dynamic positive spring rate, said means being effective to compensate for static gimbal unbalances produced in said assembly by misalignments between the latter's axes and mass unbalnces in the rotor and/or gimbals of said assembly, said means comprising an elongated, slim rod coaxially positioned relative to said spin axis and axially adjustable thereto for calibrating said gimbal unbalance compensation and further including means for adjustably supporting said rod within said flexure hinge assembly, said adjustable supporting means being adapted to provide a frictional grip on said rod sufficient to maintain the axial position thereof during normal operation of said gyroscope at a given rotor angular velocity.

3. The apparatus of claim 2 wherein said adjustable supporting means comprises a sleeve member disposed within the inner middle gimbal portion of said flexure hinge assembly coaxial to said spin axis, said sleeve member comprising a cylindrical main body portion and a plurality of axially tapered spring fingers respectively integral with said main body portion at one end thereof whereby the free ends of said fingers are normally spring biased radially inward with respect to said spin axis.

4. The method of calibrating spring rate and gimbal unbalance in a free-rotor flexure-suspended gyrocsope comprising the steps of:

measuring the positive spring rate of said gyroscope, supporting a balance mass within the flexure suspension of said gyroscope, said balance mass being coaxially positioned relative to the gyro's spin axis and having a moment of inertia sufficient to substantially cancel the suspension's positive spring rate, axially adjusting the position of said mass whereby said gimbal unbalance is substantially cancelled, removing a portion of the mass of said balance mass for providing a vernier adjustment to the latter's moment of inertia, and readjusting the axial position of said mass for cancelling the gimbal unbalance produced when said portion of said mass was removed.

References Cited

UNITED STATES PATENTS

| | | | |
|---|---|---|---|
| 3,264,880 | 8/1966 | Fischel | 74—5 |
| 3,301,073 | 1/1967 | Howe | 74—5 XR |
| 3,315,533 | 4/1967 | Litty | 74—5 |
| 3,354,726 | 11/1967 | Krupick et al. | 74—5 |
| 3,413,858 | 12/1968 | Samet | 74—5 |
| 3,427,828 | 2/1969 | Stiles | 74—5 XR |
| 2,859,626 | 11/1958 | Maze | 74—5 XR |

MANUEL A. ANTONAKAS, Primary Examiner